United States Patent
Cherry et al.

[19]

[11] Patent Number: 6,116,626
[45] Date of Patent: Sep. 12, 2000

[54] INDEPENDENT FRONT SUSPENSION

[75] Inventors: Herbert J. Cherry, Albion, Pa.;
William J. Hicks, Muskegon, Mich.

[73] Assignee: Holland Neway International, Inc., Muskegon, Mich.

[21] Appl. No.: 09/338,111

[22] Filed: Jun. 23, 1999

Related U.S. Application Data

[63] Continuation of application No. PCT/US98/26271, Dec. 10, 1998.
[60] Provisional application No. 60/069,671, Dec. 12, 1997, and provisional application No. 60/104,071, Oct. 13, 1998.

[51] Int. Cl.$^7$ ............................. B60G 3/20; B60G 11/27; B62D 7/18
[52] U.S. Cl. ............................. 280/124.135; 280/124.139; 280/124.157; 280/93.512; 188/329
[58] Field of Search ............................. 280/93.512, 124.135, 280/124.136, 124.139, 124.142, 124.143, 124.157, 124.112, 124.113, 124.125; 188/329, 330, 17, 18 R

[56] References Cited

U.S. PATENT DOCUMENTS

| | | | |
|---|---|---|---|
| 2,913,251 | 11/1959 | Herbenar | 280/93.512 |
| 4,097,057 | 6/1978 | Goodrich, Jr. et al. | |
| 4,313,619 | 2/1982 | Hailer | 280/93.512 |
| 4,718,686 | 1/1988 | Dziuba et al. | |
| 4,744,587 | 5/1988 | Veneau | |
| 4,974,872 | 12/1990 | Reise | |
| 5,129,474 | 7/1992 | Rauter et al. | |
| 5,624,011 | 4/1997 | White et al. | |
| 5,638,928 | 6/1997 | Wemple | 188/329 |
| 5,649,612 | 7/1997 | Walker et al. | 188/329 |
| 5,651,561 | 7/1997 | Tandy, Jr. et al. | |

FOREIGN PATENT DOCUMENTS

| | | |
|---|---|---|
| 0 806 310 | 11/1997 | European Pat. Off. . |
| 618 843 | 3/1927 | France . |
| 37 18 137 | 12/1988 | Germany . |
| 37 40 954 | 6/1989 | Germany . |

OTHER PUBLICATIONS

Author unknown, article entitled "Low–floor city buses," Automotive Engineer, vol. 19, No. 5, Oct. 1, 1994, p. 12. (XP000472089).
A. Stengelin, "Der Neue Reisebus 0 404 Von Mercedes–Benz,", ATZ Automobiltechnische Zeitschrift, vol. 94, No. 1, Jan. 1, 1992 pp. 4–6, 8, 11–16 XP000241628.
Dyke's Automobile and Gasoline Engine Encyclopedia, 1934, pp. 30–31.
Author unknown, from NEOPLAN, "Transliner: Die preiswerte Alternative," undated, pages not numbered.

*Primary Examiner*—Peter C. English
*Assistant Examiner*—Lynda Jasmin
*Attorney, Agent, or Firm*—Rader, Fishman, Grauer & McGarry, an Office of Rader, Fishman & Grauer PLLC

[57] ABSTRACT

A steerable independent front suspension having upper and lower wishbone control arms, each control arm pivotally mounted to a suspension frame which in turn is adapted to be mounted to a vehicle frame. The other end of the control arms are pivotally mounted to an upper and lower end of a knuckle post, which has an opening extending therethrough. A steering knuckle is pivotally mounted to the knuckle post and mounts an S-cam brake assembly having a brake actuator extending therefrom. The knuckle post opening is positioned and sized to receive the brake actuator when the steering knuckle is pivoted to a maximum position to increase the steering angle of the vehicle.

17 Claims, 8 Drawing Sheets

INDEPENDENT FRONT SUSPENSION

CROSS-REFERENCE TO RELATED APPLICATIONS

This application is a continuation of International Application No. PCT/US98/26271, filed Dec. 10, 1998, which claims the benefit of U.S. Provisional Application Ser. No. 60/069,671, filed Dec. 12, 1997, and U.S. Provisional Application Ser. No. 60/104,071, filed Oct. 13, 1998.

BACKGROUND OF THE INVENTION

1. Field of the Invention

This invention relates to a suspension system for a steered wheel of a vehicle and more particularly to an independent front suspension using S-cam brakes with improved steering radius and load capacity while maintaining good handling characteristics.

2. Description of the Related Art

A variety of suspension systems are available for cars, trucks, and other wheeled vehicles. The particular suspension design selected for a particular vehicle depends on a number of considerations. These considerations include the purpose of the vehicle, the gross vehicle weight, whether the suspension supports the front or the rear of the vehicle, whether the wheels are steerable and whether the wheels are driven. No suspension system is ideal for all applications.

For heavy-duty applications, a conventional beam axle design provides strength, rigidity, accurate steering and tire-wear control. However, the beam axle translates a singular tire input (bump) to the other side wheel, thereby affecting steering performance parameters to the vehicle. Independent wheel suspensions isolate the right and left side wheel inputs.

One important consideration in independent suspension design is the maximum steering angle. A greater steering angle affords a tighter radius of turn and hence, is preferable in order to increase vehicle maneuverability. In the United States S-cam type brakes are typically used on heavy-duty truck and bus wheels. These brakes have a camshaft assembly, slack adjuster, and brake actuator assembly that are all mounted on the wheels and thus turn together with the wheel during steering. These components present a challenge for the design of a suspension in a relatively small space and at the same time with a small turning radius for the suspension. Typically, these components require a relatively wide space in the suspension to prevent interference between these components and the suspension support elements during turning of the vehicle. However, increasing the spacing from the wheel to the suspension results in increasing the scrub radius of the suspension.

The scrub radius is the distance, at the ground, between a vertical line passing through the center of the vehicle tire and the projection of the axis of rotation of the wheel when viewed from the front of the vehicle. In essence, the scrub radius defines the moment arm for road surface induced forces that apply a moment to the suspension. However, some scrub radius is required for directional stability and straight line performance. The greater the scrub radius, the greater will be the moment applied to the suspension. As the magnitude of the moment increases, more resistance is in the form of larger air springs or stronger suspension/steering components, for example, is required. Further, with larger scrub radii, the handling and maneuverability of the suspension declines substantially Further, larger and heavier parts are required to handle the increased resistance requirements.

Thus, it is desirable to keep the scrub radius as small as possible without negatively impacting stability and performance. However, minimizing the scrub radius militates against providing a smaller turning radius for the suspension for S-cam brake suspensions. Thus, suspensions for S-cam brakes have heretofore been a compromise between weight, maneuverability, steering radius and load capacity. No one suspension has been able to maximize these suspension requirements for S-cam brakes in heavy-duty suspensions.

There is a need for heavy-duty independent front suspensions with S-cam brakes having smaller steering angles without sacrificing other suspension qualities such as load capacity, weight and handling.

SUMMARY OF THE INVENTION

According to the invention, a steerable independent front suspension for a vehicle has a frame to which the independent front suspension is mounted and comprises at least one upper arm having a first end and a second end, the latter of which is adapted to be pivotally mounted with respect to the vehicle frame, at least one lower arm having a first end and a second end, the latter of which is adapted to be pivotally mounted with respect to the vehicle frame, a knuckle post having an upper portion pivotally connected to the first end of the at least one upper arm, a lower portion pivotally connected to the first end of the at least one lower arm and an outer leg connecting the upper and lower portions, a steering knuckle pivotally mounted to the knuckle post for pivotal movement about a steering axis and a spindle extending laterally from the steering knuckle and having a longitudinal axis that defines a wheel axis of rotation. An S-cam brake assembly is mounted to the steering knuckle for rotation therewith about the steering axis and in a position radially offset from the wheel axis of rotation and operably positioned to apply braking force to a wheel mounted to the spindle. According to the invention, the outer leg of the knuckle post defines a shape to avoid interference with a portion of the S-cam brake assembly as the steering knuckle is rotated about the steering axis in a direction to move the S-cam brake assembly toward the knuckle post to thereby increase the turning angle of the suspension. Preferably, the outer web of the knuckle post is sized and positioned to receive at least a portion of the S-cam brake assembly when the steering knuckle is rotated toward the knuckle post.

In one embodiment, the knuckle post further has an inner leg extending between the knuckle post upper and lower ends to define with the outer web, upper and lower portions of the knuckle post a brake actuator aperture that receives the portion of the S-cam brake assembly. Further, the knuckle post outer leg has a king pin boss with an opening and is positioned between the knuckle post upper and lower portions, the steering knuckle has a pair of spaced king pin bosses with openings and between which is received the knuckle post king pin boss, and a king pin extends through the openings of the steering knuckle and knuckle post king pin boss openings to pivotally mount the steering knuckle to the knuckle post and define the steering axis.

In a preferred embodiment, there are two upper arms, each of which are pivotally mounted to the upper portion of the knuckle post at the first end and is adapted to be pivotally mounted with respect to the vehicle frame at the second end. Further, there are two lower arms, each of which are pivotally mounted to the lower portion of the knuckle post at the first end and is adapted to be pivotally mounted with respect to the vehicle frame at the second end.

In another preferred embodiment, the outer leg includes a scalloped portion sized and positioned to receive a portion of the S-cam brake assembly when the steering knuckle is rotated toward the knuckle post.

Typically, the S-cam brake assembly a mounting plate, an S-shaped cam rotatably mounted to the mounting plate; a camshaft connecting the S-shaped cam to the brake actuator and a pair of opposing brake pads positioned on opposite sides of the spindle. Each brake pad has one end pivotally mounted to the mounting plate and another end in abutting relationship with a portion of the S-shaped cam, whereby actuation of the brake actuator, rotates the camshaft, to rotate the S-shaped cam, to pivot the brake pad other ends outward relative to the spindle about their one end, to apply the brakes.

Further, the suspension includes a steering linkage for controlling the pivotal movement of the steering knuckle. The steering linkage includes a tie rod arm having one end pivotally connected to the steering knuckle, and the outer arm has a second scalloped portion sized and positioned to receive a portion of the tie rod arm when the when the steering knuckle is rotated toward the knuckle post.

A wheel is rotatably mounted to the spindle and has a vertical centerline. The distance between the intersection of the wheel vertical center line and ground level and the steering axis and ground level defines a scrub radius, and the scrub radius is approximately in the range of 2 to 4 inches. Further, the steering axis is orientated at an acute angle relative a vertical line and the acute angle is approximately in the range of 5 to 7 degrees.

Further according to the invention, the knuckle post has an air spring mounting plate extending from the knuckle post upper portion and an air spring is mounted to the air spring mounting plate.

In a preferred embodiment of the invention, the steerable independent front suspension further comprising a unitary suspension frame, the second ends of the at least one upper and lower arms are pivotally mounted to the suspension frame on opposite sides of the suspension frame to define a unitary structure, and the suspension frame is adapted to mount to the vehicle frame.

In another preferred embodiment of the invention, the knuckle post upper, lower and outer leg define a knuckle post plane generally transverse to a longitudinal axis of the vehicle and the portion of the S-Cam brake assembly intersects the knuckle post plane inwardly of the outer leg when the steering knuckle is rotated toward the knuckle post. In this embodiment, the knuckle post inner leg lies in the knuckle post plane and extends between the knuckle post upper and lower ends to define with the outer web, upper and lower portions of the knuckle post a brake actuator aperture which receives the portion of the S-cam brake assembly.

Large steering excursions are made possible by the suspension geometry that includes scalloped and open portions formed in the knuckle post. As a result, brake and steering assembly elements can rotate through a greater angle of rotation without interference with other structural elements.

The invention also provides for a relatively small scrub radius. Preferably, the scrub radius is between 2–4" for a steering axis angle of 5° to 7°.

Further, the suspension structure provides for the efficient placement of the air spring, such that almost all of the air spring force resists the road induced forces on the spindle. The efficient air spring location permits the usage of a smaller air spring, increased load capacity or both.

These and other objects, features, and advantages will be apparent from the ensuing description taken in conjunction with the accompanying drawings.

BRIEF DESCRIPTION OF THE DRAWINGS

The invention will now be described with reference to the drawings in which.

DETAILED DESCRIPTION OF THE PREFERRED EMBODIMENTS

Figure 1:
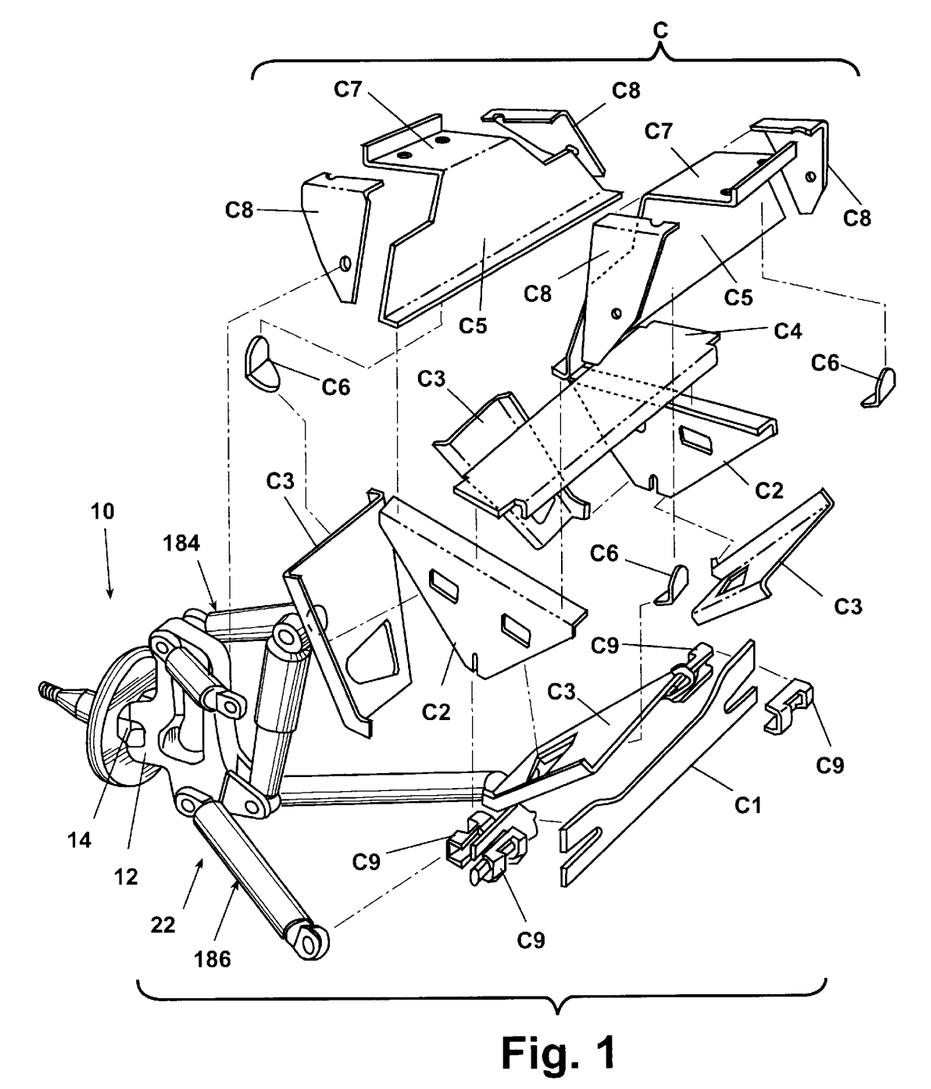
FIG. 1 is an exploded assembly view of an independent front suspension and cradle assembly according to the invention.
Figure 2:
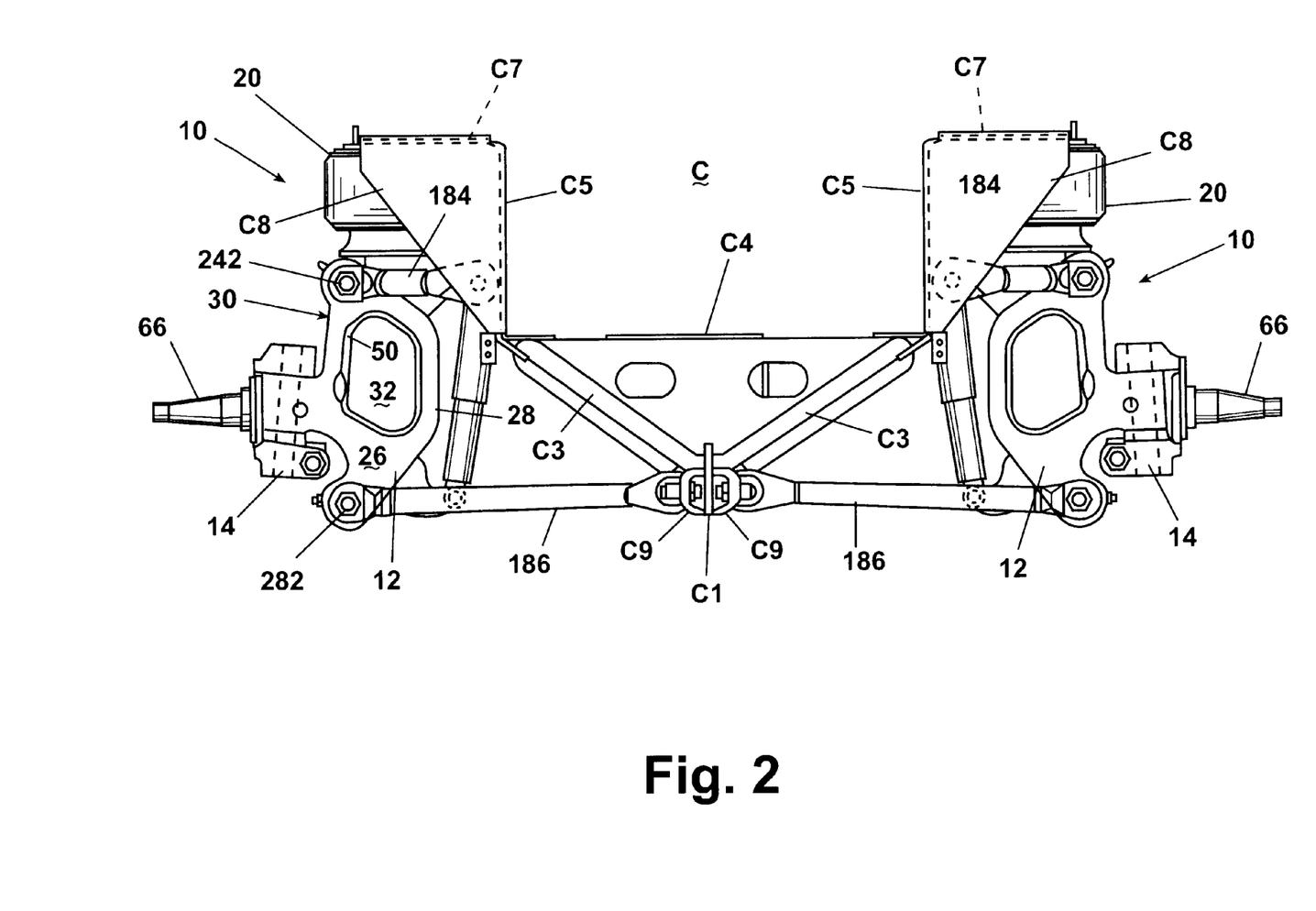
FIG. 2 is a front plan view of a complete assembled unitary independent front suspension according to the invention.
Figures 9, 10:
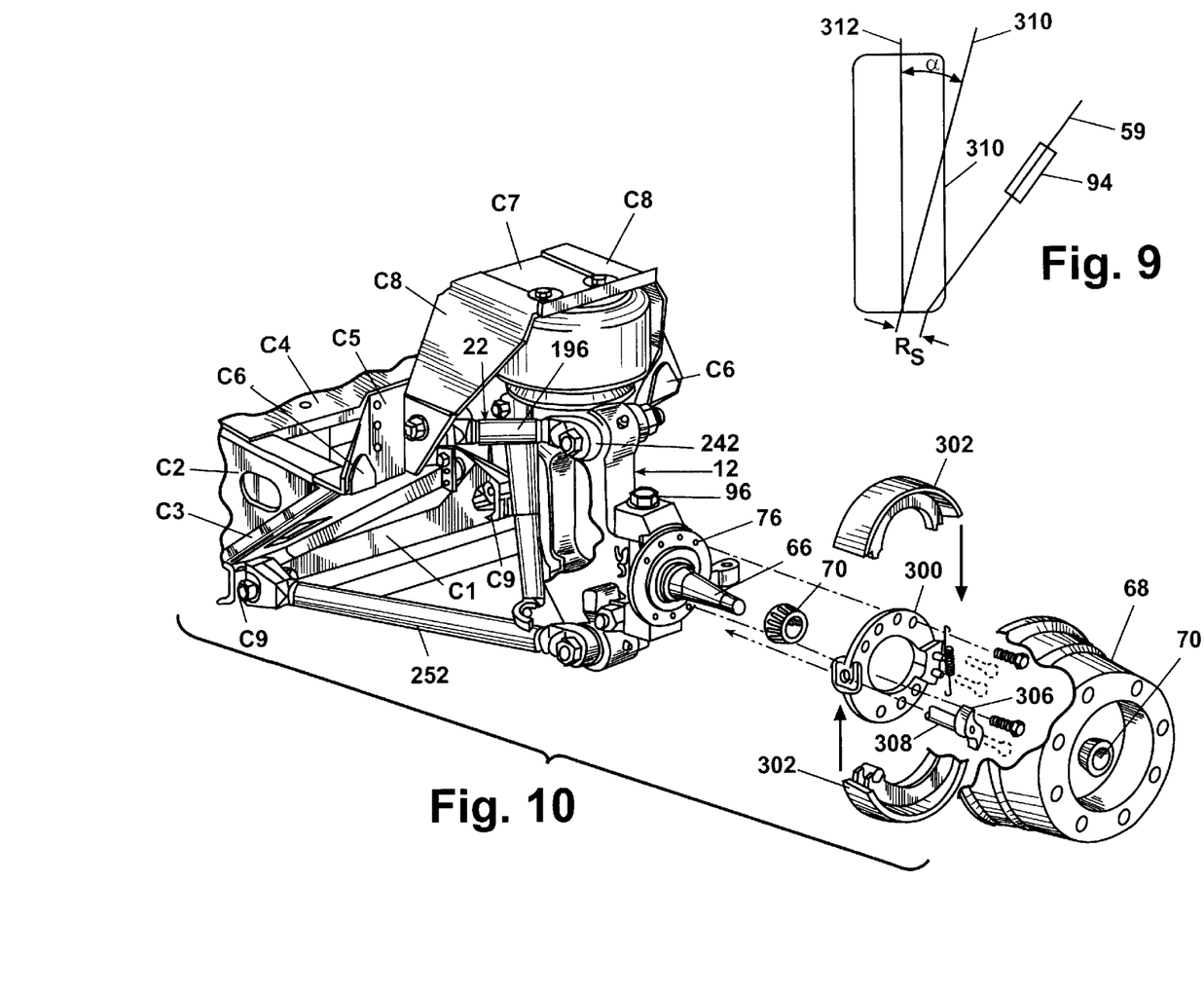
FIG. 9 is a schematic representation of the camber and steering axis angles of the suspension of FIG. 3.
FIG. 10 is an exploded view of the independent front suspension illustrating the connection of the S-cam brake assembly and the brake drum to the spindle of the independent front suspension.

Referring to FIGS. 1, 2 and 10, there is illustrated a cradle C to which is mounted an independent front suspension assembly 10. The cradle C is mounted to the vehicle frame and, thus, provides support for the independent front suspension assembly 10 and the mounting of the independent front suspension assembly 10 to the vehicle frame. For clarity, only the major components of the independent front suspension assembly 10 are shown in FIG. 1. Additionally, only one of the independent front suspension assemblies 10 is shown in FIG. 1; however, as illustrated in FIG. 2, an independent front suspension assembly 10 is provided on both sides of the cradle 1.

As best seen in FIGS. 1, 2 and 10, the cradle C comprises multiple members which are made from steel plating and welded together. The foundation of the cradle C is formed by the plate beam C1 to which triangular-shaped end plates C2 are mounted at opposing ends of the plate beam C1 by inserting the plate beam C1 within slots at the bottoms of the end plates C2. A plurality of side plates C3 are positioned at each corner of the intersection of the end plates C2 and plate beam C1 and correspondingly welded to the end plates C2 and plate beam C1. A top beam C4 spans the upper edges of the end plates C2 and is welded to a laterally extending flange of the end plates C2. Side walls C5 are mounted to the upper edges of the end plates C2 by welding a portion of an inwardly directed flange of the side wall C5 to the inward flange of the end plates C2 and welding support brackets C6 to the side plates C3 and the side walls C5. The sidewalls C5 have an overhanging portion C7 adapted to mount an air spring and to which are mounted end brackets C9. Control arm brackets C8 are provided on the plate beam for mounting the independent front suspension to the cradle C.

The independent front suspension assembly 10 comprises a double wishbone assembly 22 mounted to a knuckle post 12, which supports a steering knuckle 14. The double wishbone assembly 22 comprises an upper wishbone 184, which pivotally connects an upper portion of the knuckle post 12 to the control arm brackets C8, and a lower wishbone 186, which connects a lower portion of the knuckle post 12 to the end brackets C9.

Figure 3:
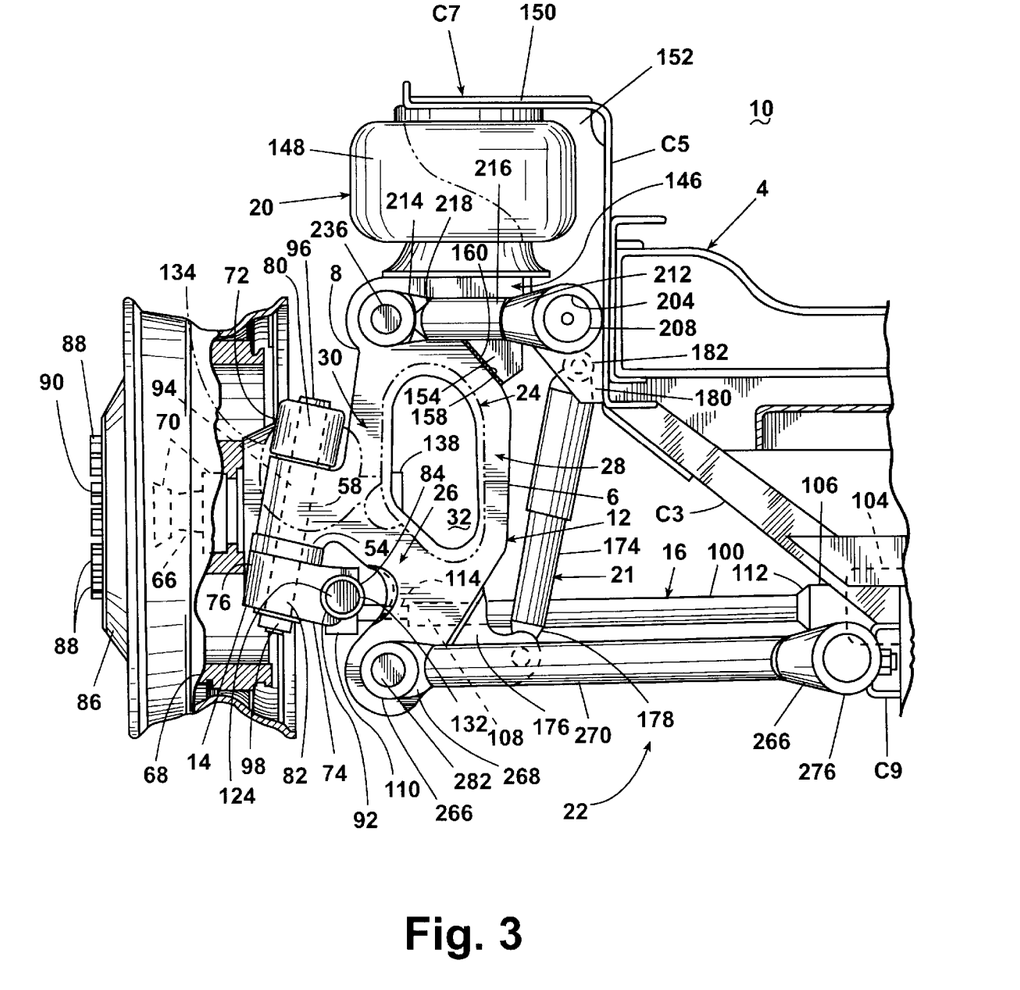
FIG. 3 is an enlarged portion of FIG. 2, illustrating the left side of the independent front suspension systems of FIG. 2 with the addition of a brake drum and wheel partially sectioned.

As best seen in FIGS. 3 and 10, when assembled, the combined cradle C and opposing independent front suspension assemblies 10, form a unitary structure that can be mounted directly to a vehicle frame 4. Preferably, the vehicle frame 4 is attached to the side walls C5. The advantage of a unitary assembly is the ability to mount and align the steering assemblies with respect to the cradle, independent of the frame. Thus, when the unit is installed to the vehicle frame, it is only necessary to align the cradle with respect to the frame to obtain proper alignment of the independent front suspensions. However, it is possible to mount the independent front suspension directly to the vehicle frame without the intervening cradle.

Referring now to FIGS. 3–10, an independent front steering suspension system 10 includes a knuckle post 12 having an inboard end 6 and an outboard end 8. The knuckle post 12 is pivotally connected at the outboard end 8 to a steering knuckle 14 which is articulated by a steering linkage assembly 16 and interconnected to a brake assembly 18. An air spring assembly 20 is provided between the knuckle post 12 and cradle support bracket C7. A shock absorber assembly 21 is mounted to the knuckle post 12 at the inboard end 6 and pivotally connected to the cradle sidewall C5. At the inboard end 6, the knuckle post 12 is pivotally connected to the cradle end brackets C9 by a double wishbone assembly 22.

Figure 4:
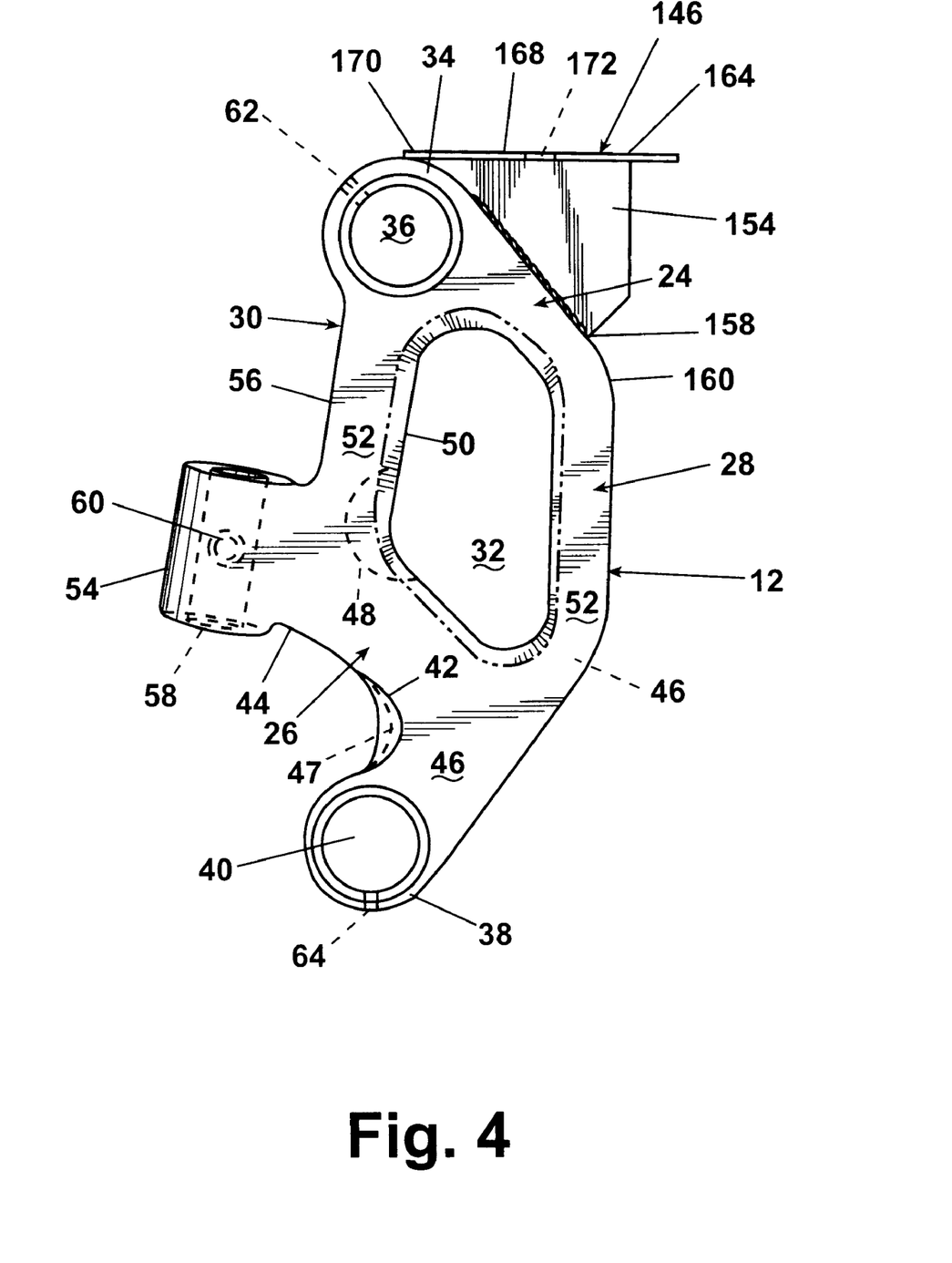
FIG. 4 is a front elevational view of a knuckle post and pedestal assembly used in the suspension system shown in FIG. 2.

With particular reference to FIG. 4, the knuckle post 12 is formed from a series of integrally formed webs or legs including an upper leg 24, a lower leg 26, an inner leg 28, and an outer leg 30 to define a generally A-shaped member with a generally oblong brake through hole 32 defined by an inner surface 50. The knuckle post 12 is preferably cast from steel, or alternatively can be forged. All legs 24, 26, 28, 30 have substantially rectangular cross-sections. The upper leg 24 has a lobe 34 with an upper wishbone bearing aperture 36 and a keyhole 62 machined perpendicular to the axis of the aperture 36. The lower leg 26 also has a lobe 38 with a lower wishbone bearing aperture 40 and a keyhole 64 machined perpendicular to the axis of the aperture 40. Furthermore, the lower leg 26 includes a first scalloped portion 42 adjacent to the lobe 38 at the intersection of an outer surface 44 and rear surface 46 of the lower leg 26. The lower leg 26 has a second scalloped portion 47 adjacent to lobe 38 at the intersection of an outer surface 44 and a front surface 52. The outer leg 30 has a third scalloped portion 48 adjacent to the lower leg 26 at the intersection of an inner surface 50 and rear surface 46 of the outer leg 30. The outer leg 30 has a kingpin boss 54 protruding from an outer surface 56. A cylindrical bore 58 is machined through the boss 54 for accepting a kingpin 94 and a kingpin bushing or bearing (not shown) which are conventional and well known. A keyhole 60 is machined perpendicular to the axis of the bore 58. The kingpin or steering axis 59 is inclined to exhibit camber as well as caster so that good steering stability is provided at large steering excursions. Camber is preferably selected at 6.5 degrees and caster at 3.0 degrees. Although the knuckle post is preferably made with the reinforcing leg 28, the knuckle post can be made into a C-shape without the leg 28. In this case, the upper leg 24 can be shaped to project inwardly in a triangular fashion to support the pedestal assembly 146.

The steering knuckle 14 is usually made using a well-known forging process that results in the formation of a spindle 66 which extends outwardly and upon which the bearings 70 of a brake drum 68 are piloted. A wheel hub 86 is secured to the brake drum 68 by bolts 88 fastened at a flange 90. The steering knuckle 14 includes an upper kingpin boss 72 and a lower kingpin boss 74 which are formed as one piece with the steering knuckle and extend outwardly from a central mounting plate 76 which is provided with a plurality of mounting apertures FIG. 2 for securing a spider assembly 300 of an S-cam brake assembly 18 (FIG. 6) in conventional fashion. The upper kingpin boss 72 includes an upper kingpin bore 80. In axial alignment with the upper kingpin bore 80 is a lower kingpin bore 82 formed in the lower kingpin boss 74. A tie-rod arm attachment boss 84 is formed on an inner end of the lower kingpin boss 74 and includes a tie-rod arm attachment bore 92.

The knuckle post 12 is pivotally connected to the steering knuckle 14 by passing a kingpin 94 through the upper and lower kingpin bosses 72, 74 of the steering knuckle 14 and through the kingpin boss 54 of the knuckle post 12. The bores 58, 80, and 82 are provided with kingpin bushings (not shown) and the kingpin 94 is secured in the bosses by an upper screw-in cap 96 and a lower screw-in cap 98.

Figure 5:
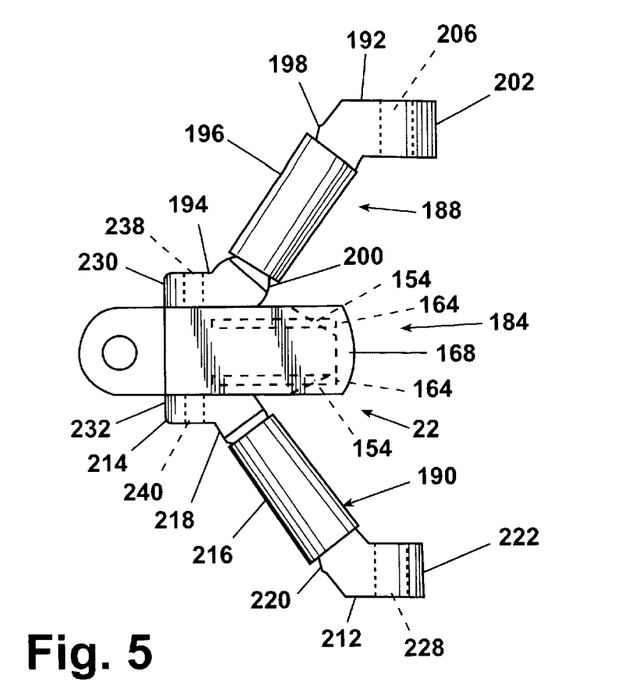
FIG. 5 is a top plan view of the knuckle post and upper wishbone assembly used in the suspension system shown in FIG. 2.
Figure 6:
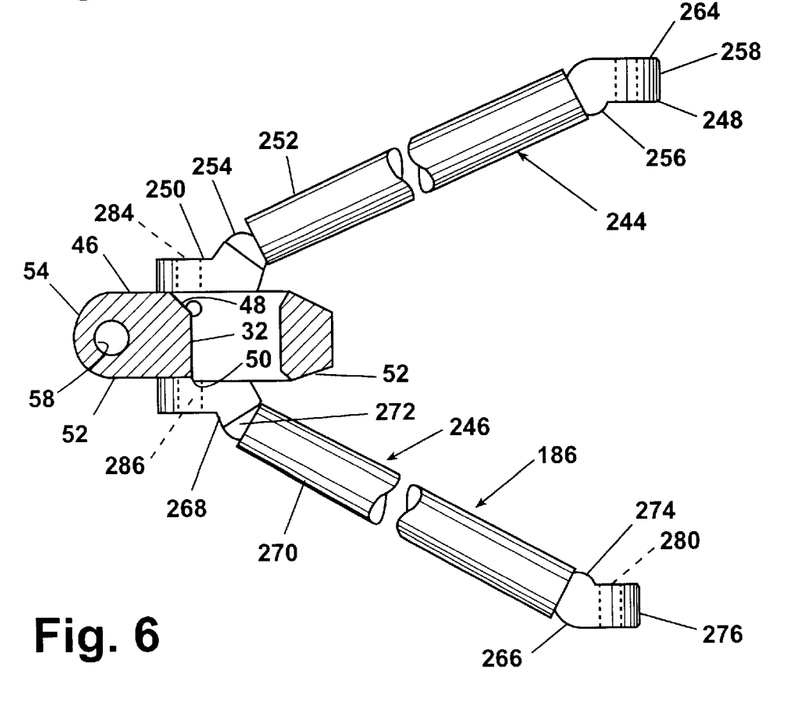
FIG. 6 is a top plan view, partly in section, of the lower wishbone assembly and knuckle post used in the suspension system shown in FIG. 2.

The steering linkage assembly 16 is shown in FIGS. 1, 5 and 6 and includes a tie rod 100, a tie-rod arm 102, and a steering arm 104. The tie rod 100 has a first end 106 which is adjustable by means of toe-in adjustment mechanism 112 and is pivotally connected to the steering arm 104 at a second end 108. The second end 108 includes toe-in adjustment mechanism 114 and ball joint 110 with a stud portion 116. The tie-rod arm 102 has a tie-rod attachment boss 122 at a first end 120 and a pin 124 at a second end 126. The tie rod 100 is pivotally connected to the tie-rod arm 102 by journalling the stud portion 116 through a bore (not shown) in the tie rod attachment boss 122 and securing it thereto by a castle nut 130.

The steering linkage assembly 16 is connected to the steering knuckle 14 by passing the pin 124 of the tie-rod arm 102 through the tie-rod arm attachment bore 92 of the steering knuckle 14 and securing it by a castle nuts 132, a cotter pin (not shown), and a key (not shown). These connections are conventional in the steering suspension art.

The S-cam brake assembly 18 is also shown in FIGS. 3, 7, 8 and 10 and includes a brake actuator 134 mounted to a bracket 136. The brake assembly 18 comprises a spider assembly 300 to which is mounted conventional brake shoes 302 that are moved by means of an S-cam 306 attached to a camshaft 308 housed in a support tube 140 and splined in conventional fashion to a slack adjuster 138. Rotation of the S-cam 306 biases the brake shoes 302 against the inside of the brake drum 68 to apply the brakes. The support tube 140 passes through an aperture 144 in the bracket 136 and is non-rotatably attached to the spider assembly 300 and supports the camshaft which passes therethrough. A push rod 142 extends from the brake actuator 134 to and pivotally connects with the slack adjuster 138 by conventional pivot mounting. Activation of the brake actuator 134 rotates the slack adjuster and the camshaft to rotate the S-cam to apply the brakes. Rotation of the steering knuckle 14 induces rotation of the brake assembly 18 since both are fixed to the spider assembly.

Referring now to FIG. 3, the air spring assembly 20 includes an air spring 148 supported at one end by a pedestal assembly 146 mounted to the knuckle post 12 and at the other end to a wheel case housing 152 through a stop plate 150. The pedestal assembly 146 includes a pair of parallel gussets 154. The lower surface 158 of the gussets 154 are welded to an outer surface 160 of the upper leg 24 as illustrated in FIG. 2. The upper surfaces 164 of the gussets 154 are welded to a support plate 168 so that an outer end 170 abuts the lobe 34. The support plate 168 is provided with an aperture 172 for securing the air spring 148 to the pedestal assembly 146. The stiffness of the air spring can be controlled by changing the air pressure within the air spring bellows. However, since air suspension does not normally provide dampening, shock absorbers are also connected to the knuckle post 12 to further improve the stability of the suspension link structure.

The location of the air spring directly on top of the knuckle post is advantageous to the invention. The air spring location provides for substantially all of the air springs' force to be used to respond to the road induced loads on the spindle. The air spring sits atop the knuckle post 12, which effectively permits almost all of its force to be applied to the spindle 66 because the kingpin connection is for all practical purposes a rigid connection. Prior suspensions mounted the air spring to one of the wishbones, A-arms, or similar components instead of the knuckle, which results in a portion of the air spring force being transferred to and absorbed by the pivotal connection of the wishbone or A-arm to the vehicle frame.

The shock absorber assembly 21 includes a shock absorber 174 with a lower end 178 pivotally connected to a lower shock bracket 176 and an upper end 180 pivotally connected to an upper shock bracket 182. The upper shock bracket 182 is mounted to the wheel case housing 152 and the lower shock bracket 176 is welded to the outer surface 44 of the lower leg 26. The lower shock bracket 176 extends outwardly and upwardly from the outer surface resulting in the inclination of the longitudinal axis of the shock absorber 174. The oscillation resulting from the jounce or rebound of the knuckle post 12 is dampened by the shock absorber 174.

With particular reference to FIGS. 5 and 6, the wishbone assembly 22 includes an upper wishbone 184 and a lower wishbone 186. The upper wishbone 184 includes a first control arm 188 and a second control arm 190. The first control arm 188 comprises an inboard link 192 and an outboard link 194 interconnected by a central link 196 through a first ball-and-socket joint 198 and second ball-and-socket joint 200. The inboard link 192 has an inboard end 202 which is movably connected to the wheel case housing 152 through a pin 208 and bushing 204 disposed within bore 206. The second control arm 190 comprises an inboard link 212 and an outboard link 214 interconnected by a central link 216 through a first ball-and-socket joint 218 and second ball-and-socket joint 220. The inboard link 212 has an inboard end 222 which is movably connected to the wheel case housing 152 through a pin and bushing (not shown) disposed within bore 228. The upper wishbone 184 extends laterally outwardly relative to the vehicle body and is rotatably connected to the knuckle post 12 by passing a swivel pin 236 through bores 238, 240 at outboard ends 230, 232 of the first and second control arms, respectively, and through an antifriction bearing 234 disposed within the upper wishbone aperture 36 of the knuckle post 12 and secured by a pin and nuts 242.

With particular reference to FIG. 6, the lower wishbone 186 includes a first control arm 244 and a second control arm 246. The first control arm 244 comprises an inboard link 248 and an outboard link 250 interconnected by a central link 252 through a first ball-and-socket joint 254 and second ball-and-socket joint 256. The inboard link 248 has an inboard end 258 which is movably connected to the wheel case housing 152 through a pin 260 and bushing 262 disposed within bore 264. The second control arm 246 comprises an inboard link 266 and an outboard link 268 interconnected by a central link 270 through a first ball-and-socket joint 272 and second ball-and-socket joint 274. The inboard link 266 has an inboard end 276 which is movably connected to the wheel case housing 152 through a pin and bushing (not shown) disposed within bore 280. The lower wishbone 186 extends laterally outwardly relative to the vehicle body and is rotatably connected to the knuckle post 12 by passing a swivel pin 282 through bores 284, 286 at outboard ends 288, 290 of the first and second control arms, respectively, and through an antifriction bearing (not shown) disposed within the lower wishbone aperture 40 of the knuckle post 12 and secured by pin nuts 242.

Figure 7:
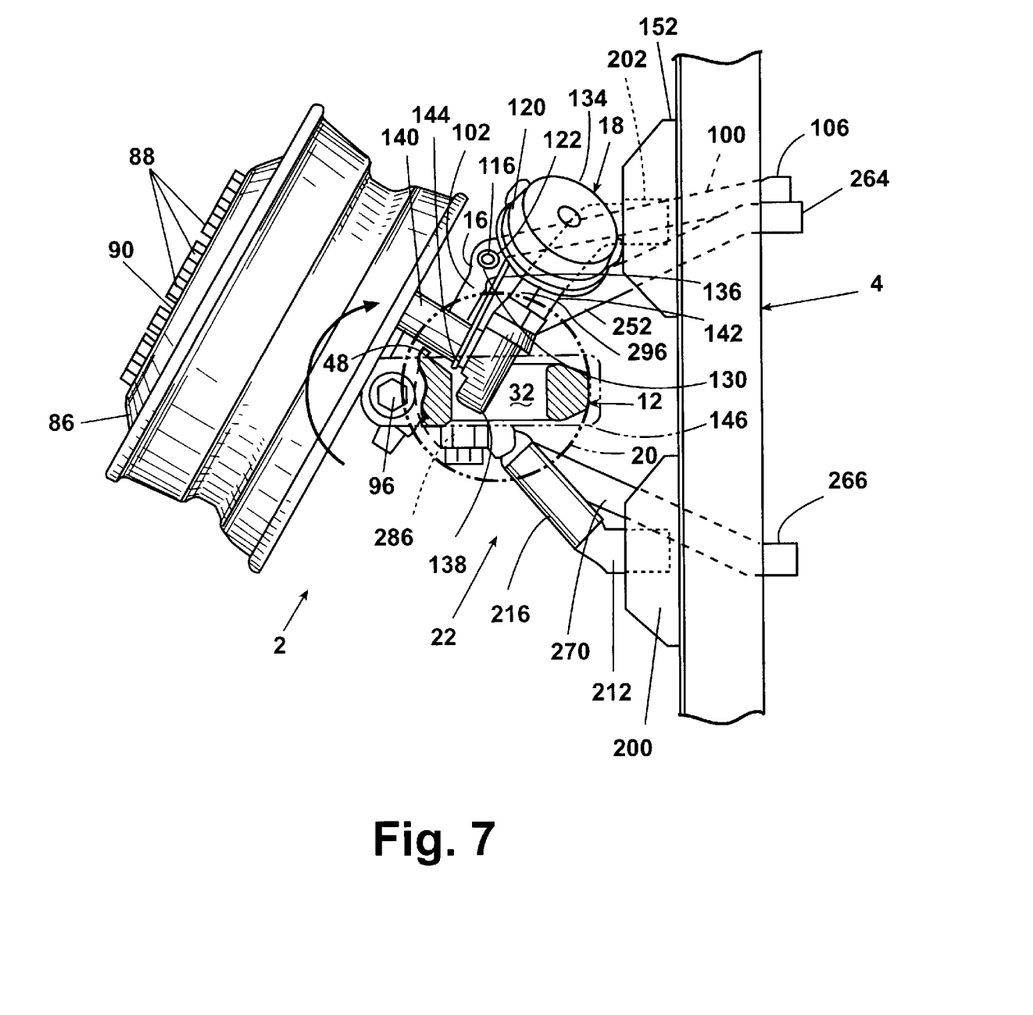
FIG. 7 is a top plan view of the independent front suspension system illustrated in FIG. 3 in an outer wheel cut position showing the interaction of a S-cam brake assembly with the knuckle post.
Figure 8:
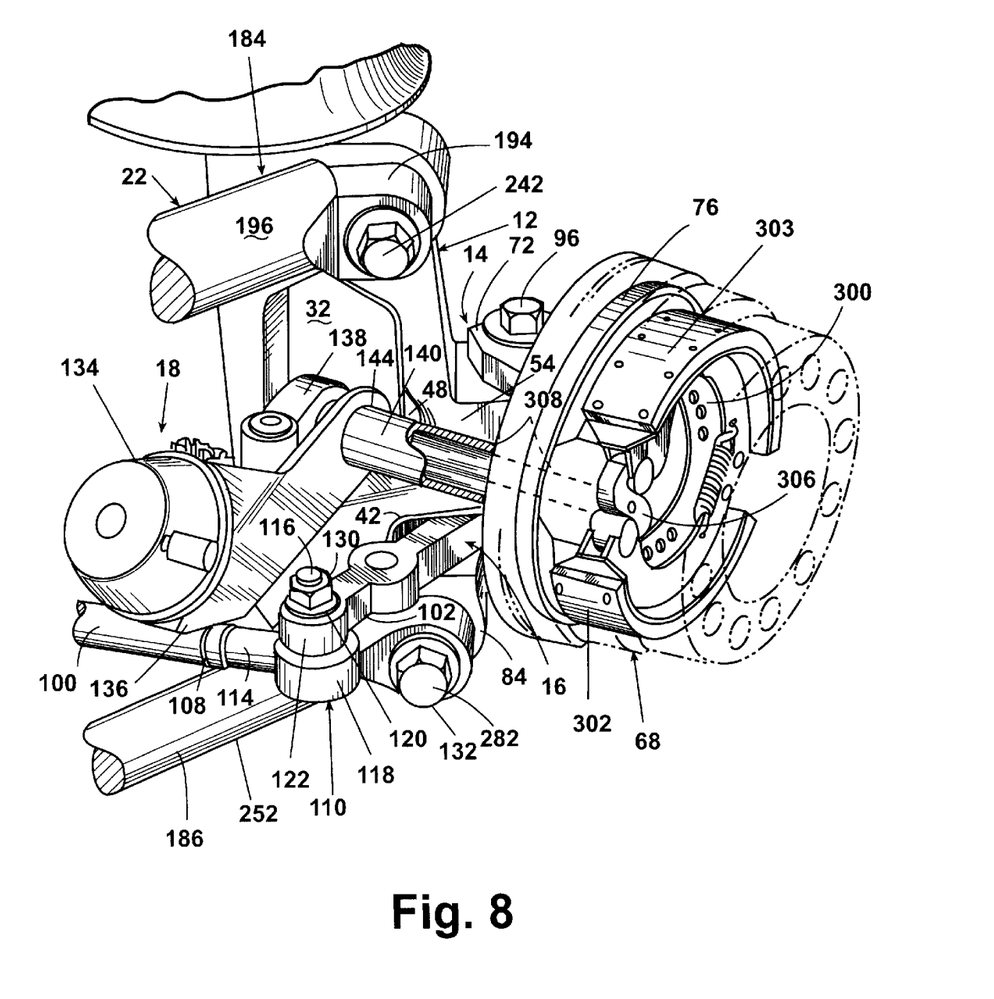
FIG. 8 is a partial cutaway perspective view of the independent front suspension system illustrated in FIG. 3 in the outer wheel cut position.

In FIGS. 7 and 8, the structural elements of the forward-right suspension elements are shown in an outer wheel cut position. Steering articulation is conveyed to the tie-rod attachment boss 84 by the steering linkage assembly 16 for turning a right steering knuckle 14. During a right-hand curve, a maximum steering angle of approximately 50 degrees is made possible by the suspension geometry. As a right turn is made, the brake through hole 32, the first scalloped portion 42 and the third scalloped portion 48 of the knuckle post 12 provide a space for the slack adjuster 138, bracket 136 and a portion of the support tube 140 to enter during rotation of the wheel to the position shown in FIGS. 7 and 8 without interference from the knuckle post 12 or any portion thereof. At a maximum steering, the slack adjuster 138 and bracket 136 are positioned slightly within the hole 32 and the support tube 140 is positioned adjacent to the third scalloped portion 48. The first scalloped portion 42 provides a space for free passage of the tie-rod arm 102 and is positioned adjacent thereto at a maximum steering excursion. As a left turn is made, the second scalloped portion 47 provides a space for free passage of a portion of the tie-rod attachment boss 84 and castle nut 132.

The knuckle post design, including the opening 32, advantageously permits a greater steering angle for a steering suspension incorporating an S-cam brake. The steering knuckle design has further benefits in that the front leg extends substantially directly between the pivot connections with the upper and lower wishbones, providing a more direct transfer of force from the wheel to the air spring. Although the knuckle of the invention is shown as having upper, lower, inboard and outboard legs, it is within the scope of the invention to have a single leg extending between the upper and lower wishbones. The open space inboard of the single leg will function as the opening 32 for receiving the S-cam brake assembly at the maximum steering angle. Alternatively, the knuckle post could be made from just the upper, lower, and inboard legs, resulting in a curved open-faced knuckle. However, such a structure will have an increased cost because of the manufacturing methods and material needed to ensure the curved knuckle could support the anticipated loads without failure.

FIG. 9 schematically illustrates the steering geometry of the invention. It should be noted that the angles of the geometry are exaggerated for clarity. A tire 310 mounted to the wheel 86 has a central axis or tire axis 312. The angle the tire axis forms relative to a true vertical axis 310 defines the camber angle, which is preferably 6.5°.

The distance between the steering axis 59, defined by the kingpin 94, and the vertical axis 310 at the tire/road interface defines the scrub radius Rs. The scrub radius is preferably as small as possible all things being equal because the scrub radius Rs forms the moment arm for any moment applied to the suspension associated with the road induced forces applied to the tire 310. Therefore, for a given road induced force, the greater the scrub radius, the greater will be the moment applied to the suspension. An increased scrub radius and its associated moment will impact the handling characteristics of the vehicle and the robustness of the steering system components and/or size of the air springs. Generally, a shorter scrub radius provides more desirable handling qualities. However, some scrub radius is desired for handling stability. For the invention, the scrub radius is preferably 2–4 inches for a steering axis angle of 5–7°.

The advantageous features of the knuckle post construction include a brake through hole and scalloped portions result in an independent suspension system wherein brake and steering assembly elements can rotate through a greater angle of rotation without interference with other structural elements. The resulting increased steering angle provides for increased vehicle maneuverability. Furthermore, the knuckle post construction provides for a suspension system with increased rigidity and therefore a vehicle with higher load carrying capacity.

Additionally, the air spring can be mounted directly onto the knuckle post with the knuckle post design of the invention, which minimizes the scrub radius and thus reduces the required size of the air spring. The result of which is that a smaller air spring can be used, reducing cost, or a greater vehicle load capacity can be obtained, increasing user function, or a combination of both. An alternative result is that a larger air spring can be used at a lower air pressure for the same equivalent force output. The suspension according to the invention also has a relatively small scrub radius for better handling.

The combined benefits of the knuckle post design, air spring location, and short scrub radius, results in a superior independent front suspension, which has a greater steering angle, increased loading capacity, and improved handling characteristics over previous suspensions.

Reasonable variation and modification are possible within the spirit of the foregoing specification and drawings without departing from the scope of the invention.

We claim:

1. In a steerable independent front suspension for a vehicle having a frame to which the independent front suspension is mounted, the independent front suspension comprising:

at least one upper arm having a first end and a second end, the latter of which is adapted to be pivotally mounted with respect to the vehicle frame;

at least one lower arm having a first end and a second end, the latter of which is adapted to be pivotally mounted with respect to the vehicle frame;

a knuckle post having an upper portion pivotally connected to the first end of the at least one upper arm, a lower portion pivotally connected to the first end of the at least one lower arm and an outer leg connecting the upper and lower portions;

a steering knuckle pivotally mounted to the knuckle post for pivotal movement about a steering axis and positioned outwardly of the knuckle post;

a spindle extending laterally outwardly from the steering knuckle and having a longitudinal axis that defines a wheel axis of rotation; and an S-cam brake assembly mounted to the steering knuckle for rotation therewith about the steering axis and in a position radially offset from the wheel axis of rotation and radially offset from the steering axis and operably positioned to apply braking force to a wheel mounted to the spindle;

the improvement which comprises;

the outer leg of the knuckle post defines an open space positioned inwardly of the outer leg and distal of the steering knuckle the open space receiving a portion of the S-cam brake assembly inwardly of the outer leg as the steering knuckle is rotated about the steering axis in a direction to move the S-cam brake assembly toward the knuckle post to thereby increase the turning angle of the suspension.

2. The steerable independent front suspension according to claim 1, wherein the open space of the knuckle post is sized and positioned to receive at least a portion of the S-cam brake assembly when the steering knuckle is rotated toward the knuckle post.

3. The steerable independent front suspension according to claim 1, wherein the knuckle post further has an inner leg extending between the knuckle post upper and lower ends to define with the outer leg, upper and lower portions of the knuckle post the open space which receives the portion of the S-cam brake assembly.

4. The steerable independent front suspension according to claim 3, wherein the knuckle post outer leg has a king pin boss with an opening and is positioned between the knuckle post upper and lower portions, the steering knuckle has a pair of spaced king pin bosses with openings and between which is received the knuckle post king pin boss, and a king pin extends through the openings of the steering knuckle and knuckle post king pin boss openings to pivotally mount the steering knuckle to the knuckle post and define the steering axis.

5. The steerable independent front suspension according to claim 4, wherein there are two upper arms, each of which is pivotally mounted to the upper portion of the knuckle post at the first end and is adapted to be pivotally mounted with respect to the vehicle frame at the second end.

6. The steerable independent front suspension according to claim 4, wherein there are two lower arms, each of which is pivotally mounted to the lower portion of the knuckle post at the first end and is adapted to be pivotally mounted with respect to the vehicle frame at the second end.

7. The steerable independent front suspension according to claim 3, wherein the outer leg includes a scalloped portion sized and positioned to receive a portion of the S-cam brake assembly when the S-cam brake assembly is rotated toward the knuckle post.

8. The steerable independent front suspension according to claim 7, wherein the S-cam brake assembly further comprises:

a mounting plate;

a S-shaped cam rotatably mounted to the mounting plate;

a camshaft for connecting the S-shaped cam to a brake actuator;

a pair of opposing brake pads positioned on opposite sides of the spindle, each brake pad having one end pivotally mounted to the mounting plate and an other end in abutting relationship with a portion of the S-shaped cam, whereby actuation of the brake actuator, rotates the camshaft, to rotate the S-shaped cam, to pivot the brake pad other ends outward relative to the spindle about their one end, to apply the brakes.

9. The steerable independent front suspension according to claim 8 and further comprising a steering linkage for controlling the pivotal movement of the steering knuckle, the steering linkage includes a tie rod arm having one end pivotally connected to the steering knuckle, and the outer leg has a second scalloped portion sized and positioned to receive a portion of the tie rod arm when the S-cam brake assembly is rotated away from the knuckle post.

10. A steerable independent front suspension according to claim 1 and further comprising a wheel rotatably mounted to the spindle, the wheel having a vertical center line, the distance between the intersection of the wheel vertical center line and ground level and the steering axis and ground level defines a scrub radius, and the scrub radius is approximately in the range of 2 to 4 inches.

11. A steerable independent front suspension according to claim 10, wherein the steering axis is orientated at an acute angle relative a vertical line and the acute angle is approximately in the range of 5 to 7 degrees.

12. A steerable independent front suspension according to claim 11, wherein the knuckle post has an air spring mounting plate extending from the knuckle post upper portion and further comprising an air spring having a first end mounted to the air spring mounting plate and a second end adapted to mount to the vehicle.

13. A steerable independent front suspension according to claim 1 and further comprising a unitary suspension frame, the second ends of the at least one upper and lower arms are pivotally mounted to the suspension frame on opposite sides of the suspension frame to define a unitary structure, and the suspension frame is adapted to mount to the vehicle frame.

14. A steerable independent front suspension according to claim 1 wherein the knuckle post upper, lower and outer leg define a knuckle post plane generally transverse to a longitudinal axis of the vehicle and the portion of the S-cam brake assembly intersects the knuckle post plane inwardly of the outer leg when the S-cam brake assembly is rotated toward the knuckle post.

15. A steerable independent front suspension according to claim 14, wherein the knuckle post further has an inner leg lying in the knuckle post plane and extending between the knuckle post upper and lower ends to define with the outer web, upper and lower portions of the knuckle post a brake actuator aperture which receives the portion of the S-cam brake assembly.

16. In a steerable independent front suspension for a vehicle having a frame to which the independent front suspension is mounted, the independent front suspension comprising:

at least one upper arm having a first end and a second end, the latter of which is adapted to be pivotally mounted with respect to the vehicle frame;

at least one lower arm having a first end and a second end, the latter of which is adapted to be pivotally mounted with respect to the vehicle frame;

a knuckle post having an upper portion pivotally connected to the first end of the at least one upper arm, a lower portion pivotally connected to the first end of the at least one lower arm and an outer leg connecting the upper and lower portions;

a steering knuckle pivotally mounted to the knuckle post for pivotal movement about a steering axis;

a spindle extending laterally from the steering knuckle and having a longitudinal axis that defines a wheel axis of rotation; and an S-cam brake assembly mounted to the steering knuckle for rotation therewith about the steering axis and in a position radially offset from the wheel axis of rotation and operably positioned to apply braking force to a wheel mounted to the spindle, the S-cam brake assembly comprising, a mounting plate, an S-shaped cam rotatably mounted to the mounting plate, a camshaft connecting the S-shaped cam to a brake actuator, and a pair of opposing brake pads positioned on opposite sides of the spindle, each brake pad having one end pivotally mounted to the mounting plate and an other end in abutting relationship with a portion of the S-shaped cam, whereby actuation of the brake actuator, rotates the camshaft, to rotate the S-shaped cam, to pivot the brake pad other ends outward relative to the spindle about their one end, to apply the brakes, the improvement which comprises;

the outer leg of the knuckle post defines a shape to avoid interference with a portion of the S-cam brake assembly as the steering knuckle is rotated about the steering axis in a direction to move the S-cam brake assembly toward the knuckle post to thereby increase the turning angle of the suspension, the knuckle post has an inner leg extending between the knuckle post upper and lower ends to define with the outer leg, and upper and lower portions of the knuckle post a brake actuator aperture which receives the portion of the S-cam brake assembly, and the outer leg includes a scalloped portion sized and positioned to receive a portion of the S-cam brake assembly when the S-cam brake assembly is rotated toward the knuckle post.

17. The steerable independent front suspension according to claim 16 and further comprising a steering linkage for controlling the pivotal movement of the steering knuckle, the steering linkage includes a tie rod arm having one end pivotally connected to the steering knuckle, and the outer leg has a second scalloped portion sized and positioned to receive a portion of the tie rod arm when the S-cam brake assembly is rotated away from the knuckle post.

* * * * *